United States Patent [19]

Kleimann et al.

[11] 4,033,912

[45] July 5, 1977

[54] PROCESS FOR MOLDING POLYURETHANE FOAMS

[75] Inventors: Helmut Kleimann; Wulf von Bonin, both of Leverkusen, Germany

[73] Assignee: Bayer Aktiengesellschaft, Leverkusen, Germany

[22] Filed: Nov. 6, 1974

[21] Appl. No.: 521,426

[30] Foreign Application Priority Data

Nov. 13, 1973 Germany .......................... 2356692

[52] U.S. Cl. ................... 260/2.5 AH; 260/2.5 AZ; 264/300
[51] Int. Cl.² ................ C08G 18/14; C08G 18/77; C08K 5/54
[58] Field of Search ............. 260/2.5 AH, 2.5 AZ; 264/300

[56] References Cited

UNITED STATES PATENTS

| 3,384,599 | 5/1968 | Omietanski | 260/2.5 AH |
| 3,519,579 | 7/1970 | Kanner | 260/2.5 AH |
| 3,663,468 | 5/1972 | Haluska | 260/2.5 AH |
| 3,793,300 | 2/1974 | Prokai | 260/2.5 AH |

FOREIGN PATENTS OR APPLICATIONS 668,478  8/1963  Canada .......................... 260/2.5 AH Primary Examiner—C. Warren Ivy
Attorney, Agent, or Firm—Gene Harsh; Joseph C. Gil; William E. Parry

[57] ABSTRACT

The mold release properties of a molded polyurethane foam are improved by including the foamable mixture to be molded, a reaction product of a polysiloxane and an organic monoisocyanate or polyisocyanate.

11 Claims, No Drawings

PROCESS FOR MOLDING POLYURETHANE FOAMS

PROCESS FOR MOLDING POLYURETHANE FOAMS

This invention relates generally to foam plastics and more particularly to a process for the production of foam plastics which have excellent mold release properties.

Foam plastics based on polyisocyanates, e.g. polyurethane foams which have a dense outer skin and a cellular core, of the kind obtained by the method of foaming in a mold (German Auslegeschriften Nos. 1,196,864 and 1,694,138 and French Pat. Spec. No. 1,559,325) are particularly suitable for the series production of lightweight building constructions, e.g. for the furniture, vehicle or house building industry, or elasttic molded parts such as cushions, shock absorbers and shoe soles.

The molded polyurethane articles are produced by introducing the foamable reaction mixture which contains organic polyisocyanates, compounds whih have at least two hydrogen atoms capable of reacting with isocyanates and additives, into a closed, temperature controlled mold in which it foams up and solidifies in a highly compressed form. The plastis material exactly fills the mold and reproduces accurately the internal surfaces of the mold.

The molds used for this purpose are preferably made of a material having a very high thermal capacity and conductivity, preferably a metal, although other materials may also be used, such as for example, plastics, glass, wood and the like.

To prevent parts of the molded plastic material from sticking to the surface of the mold when it is removed therefrom, the mold is lined with a mold release agent. Substances commonly used for this purpose are e.g. waxes, soaps or oils. These mold release agents form a thin film between the surface of the mold and the plastic which prevents the molded product from sticking to the mold so that the molded products can be easily removed from the mold.

For the production of molded parts one after another in the same mold, this method has various disadvantages. The mold release agent must be applied at regular intervals and, during this time, the mold is unavailable for production. Fine engravings on the mold surface, e.g. a simulated wood structure or leather grain, become covered over with residues of mold release agent over a period of time. These firmly adhering residues can only be removed from the mold wall with great effort particularly if the mold has sharp contours. Furthermore, the molded plastic products become covered with a thin film of mold release agent to which lacquer systems will not adhere, and they must therefore be rubbed down or cleaned with solvents before they are lacquered or otherwise coated so that the coating will adhere sufficiently firmly to the surface.

It has already been disclosed in German Offenlegungsschrift No. 1,953,637 that the application of a mold release agent to the mold can be dispensed with if the foamable reaction mixture contains certain additives (internal mold release agents) which impart excellent mold release properties to the molded products enabling them to be removed from metal molds with their surfaces intact. Salts containing at least 25 carbon atoms obtained from aliphtatic carboxylic acids and, preferably, primary amines or amines which contain amide or ester groups are known as such additives.

In German Offenlegungsscrift No. 2,121,670, a process has been disclosed for producing foam plastics by foaming a reaction mixture of polyisocyanates, compounds which contain reaction hydrogen atoms, water and/or organic blowing agents and additives in a closed mold, which process consists in that, for example, the additives used are a mixture of (a) salts containing at least 20 aliphatic carbon atoms of aliphatic carboxylic acids and amines which may contain amide and/or ester groups and (b) natural and/or synthetic oils, fats or waxes.

Since these additives have an internal lubricating effect on the plastics mixture, they also impart excellent flow properties to the plastics in the mold and thus reduce the formation of bubbles on the surface of the plastics material. Furthermore, these internal mold release agents have an antistatic effect as well as excellent mold release properties even in metal molds with a sharply contoured surface.

Although excellent mold release effects are achieved by the processes which are already known, it is in practice frequently found that the esters of higher fatty acids or their mixed esters whih are often used as synthetic oils or waxes are insufficiently compatible with the starting components of the foams, i.e. with the isocyanate or the polyol component. Hence, a mixture of these starting components with the fatty acid esters used as mold release agents is, in many cases, not stable in storage and separates into diffreent phases. Although this separation process can be prevented by stirring the contents of the storage vessel, stirring is not always practical because containers of this kind are frequently not equipped with stirrers. In some cases, a certain amount of separation into individual components may even occur during transport of the goods.

The problem therefore arose of finding internal mold release agents whih form a stable mixture with at least one of the starting components of the foam, i.e. a mixture which would not separate into its phases.

It is therefore an object of this invention to provide a process for molding foam plastics which is devoid of the foregoing disadvantages. Another object of the invention is to provide an improved process for molding polyurethane foams. Still another object of the invention is to provide an improved release agent for use in molding polyurethane foams. A further object of the invention is to provide an improved process for molding polyurethane foams having a dense surface skin and a cellular core. A still further object of the invention is to provide a foamable liquid composition adapted to react, expand and solidify in a mold to substantially fill the mold with a solid polyurethane foam which can be removed from the mold without undersirable sticking of the molded foam to the wall of the mold.

The foregoing objects and others are accomplished in accordance with this invention, generally speaking, by providing a foamable reaction mixture containing an organic polyisocyanate and, as an internal mold release agent, a reaction product of an organic isocyanate and a polysiloxane containing reactive hydrogen atoms. The invention also provides an improved process for molding polyisocyanate based foams wherein the foamable reaction mixture is charged to a suitable mold, the mold is closed, the reaction mixture reacts, expands and solidifies in the mold, the mold is opened and the resulting molded product is removed from the mold.

It has now surprisingly been found that such reaction products of monoisocyanates and/or polyisocyanates with polysiloxanes which contain active hydrogen atoms used either alone or in combination with other mold release agents or systems of mold release agents provide an excellent mold release effect in the production of foams by the process of foaming in the mold and, moreover, are also soluble in the isocyanate starting materials of the foams without phase separation. In addition, molded foam products obtained in this way can be lacquered without the necessity of removing mold release agent from the surface thereof.

This invention thereof provides a process for the production of foam plastics based on polyisocyanates by foaming in a closed mold, using any suitable blowing agent, such as water or an organic blowing agent, internal mold release agents and, optionally, other additives, characterized in that the internal mold release agent used in a reaction product of a polysiloxane whih contains reactive hydrogen atoms with an organic monoisocyanate or polyisocyanate.

It is preferred that the organic compound having reactive hydrogen atoms reacted with the organic polyisocyanate to produce the foam (not the polysiloxane) have a molecular weight of from about 62 to about 10,000.

The mold release effect may be determined subjectively by molding a foamable reaction mixture to form a plate, manually opening the mold and removing from it the foamed plastic plate (20 × 20 × 1 cm). The mold release forces which must be applied to remove the molded foam plastic provided by the invention are considerably lower than those required for removing otherwise identical molded foams which have been produced by foaming a reaction mixture without the mold release provided by the invention.

In the context of this invention, foam plastics based on polyisocyanates are understood to include foams which can be obtained from polyisocyanattes alone or with the addition of compounds which contain at least two Zerewitinoff active hydrogen atoms, e.g. polycarbodiimide, polyisocyanurate, polyurea, polybiuret, polyamide, polyallophanate or polyurethane foams or mixed types or other foams based on polysocyanates. The process described herein is particularly suitable for the production of foam plastics which contain polyurethane groups.

Any suitable organic polyisocyanate may be used according to the invention for producing the foams including aliphatic, cycloaliphatic, araliphatic, aromatic or heterocyclic polyisocyanates of the kind described, for example, by W. Siefgen in Justus Liebigs Annalen der Chemie, 562, pages 75 to 136, for example ethylene diisocyanate; tetramethylene-1,4-diisocyanate; hexamethylene-1,6-diisocyanate; dodecane-1,12-diisocyanate; cyclobutane-1,3-disocyanate; cyclohexane-1,3-diisocyanate, cyclohexane-1,4-diisocyanate and any mixtures of these isomers; 1-isocyanato-3,3,5-trimethyl-5-isocyanatomethyl-cyclohexane (U.S. Pat. No. 3,401,190); hexahydrotoylene-2,4-diisocyanate, hexahydrotolylene-2,6-diisocyanate and any mixtures of these isomers; hexahydro-1,3-phenylene diisocyanate, hexahydro-1,4-phenylene-diisocyanate; perhydro-2,4'-diphenylmethane diisocyanate,-4,4'-diphenylmethane-diisocyanate; phenylene-1,3-diisocyanate, phenylene-1,4-diisocyanate; tolylene-2,4-diisocyanate, tolylene 2,6-diisocyanate and any mixtures of these isomers; diphenylmethane-2,4'-diisocyanate, diphenylmethane-4,4'-diisocyanate; naphthylene-1,5-diisocyanate; triphenylmethane-4,4',4''-triisocyanate; polyphenyl-polymethylene polyisocyanates which can be obtained by aniline-formaldehyde condensation followed bby phosgenation and which have been described e.g. in British Pat. Nos. 874,4330 and 848,671; perchlorinated arylpolyisocyanates of the kind which have been described e.g. in U.S. Pat. No. 3,277,138; polyisocyanates which contain carbodiimide groups as described in U.S. Pat. No. 3,152,162 the diisocyanates described in U.S. Pat. No. 3,492,330; polyisocyanates which contain allophanate groups as described e.g. in British Pat. No. 994,890; Belgian Pat. No. 761,6226 and published Dutch Pat. No. 7,102,524; polyisocyanates which contain isocyanurate groups as described e.g. in U.S. Pat. No. 3,001,973, in German Pat. Nos. 1,022,789; 1,222,067 and 1,027,394 and in German Offenlegungsschrift Nos. 1,929,034 and 2,004,048; polyisocyanates which contain urethane groups as described e.g. in Belgian Pat. No. 752,261 or in U.S. Pat. No. 3,394,164; polyisocyanates which contain acylated urea groups in accordance with German Pat. No. 1,230,778; polyisocyanates which contain biuret groups as described e.g. in U.S. Pat. Nos. 3,124,605 and 3,201,372; in British Pat. No. 889,050 and in French Pat. No. 7,017,514; polyisocyanates which are prepared by telomerization reactions, e.g. as described in U.S. Pat. 3,654,106, polyisocyanates which contain ester groups such as those mentioned e.g. in British Pat. Nos. 965,474 and 1,072,956; in U.S. Pat. No. 3,567,763 and in German Pat. No. 1,231,688, and reaction products of the above mentioned isocyanates with acetals according to German Pat. No. 1,072,385.

The distillation residues which contain isocyanate groups from the commercial production of isocyanates may also be used and may be dissolved in one or more of the above mentioned polyisocyanates. Mixtures of the above mentioned polyisocyanates may also be used.

In general, it is particularly preferred to use commercially readily available organic polyisocyanates such as tolylene-2,4-diisocyanate and tolylene-2,6-diisocyanate and mixtures of these isomers ("TDI"); polyphenyl-polymethylenepolyisocyanates which are prepared by aniline-formaldehyde condensation followed by phosgenation ("crude MDI") and polyisocyanates which contain carbodiimide, urethane, allophanate, isocyanurate, urea or biuret groups ("modified polyisocyanates").

For preparing the semi-rigid elastic foams which are of particular interest in this invention, it is particularly preferred in the process according to the invention to use modified aromatic diisocyanates and, in particular, derivatives of diphenylmethane-4,4'-diisocyanate.

Examples of these particularly preferred polyisocyanates include 4,4'-diphenylmethane-diisocyanate which has been liquefied by partial carbodiimidization and the "liquefied" 4,4'-diphenylmethane-dusocyanate which can be obtained by reacting 1 mol of 4,4'-diphenylmethane-diisocyanate with approximately 0.1 to 0.3 mol of a dipropylene glycol or a polypropylene glycol which has a molecular weight of not more than 700.

The foamable reaction mixture provided by the invention may or may not contain an organic compound with a molecular weight of generally about 62 to about 10,000 which contains at least two hydrogen atoms determinable by the Zerewitinoff method and is capable of reacting with isocyanato groups. These include not only compounds which contain amino, thiol or carboxyl groups but, in particular, polyhydroxyl compounds, in particular those which contain from 2 to 8 hydroxyl groups, especially those with a molecular weight of about 800 to about 10,000, preferably about 1000 to about 6000, e.g. polyesters, polyethers, polythioethers, polyacetals, polycarbonates and polyester amides containing at least 2, generally 2 to 8, preferably 2 to 4, hydroxyl groups, such as those known per se for the production of both homogeneous and cellular polyurethanes.

Any suitable hydroxyl polyester may be used according to the invention such as e.g. the reaction products of polyvalent, preferably divalent alcohols to which trivalent alcohols may be added and polybasic, preferably dibasic, carboxylic acids. Instead of free polycarboxylic acids, the corresponding polycarboxylic acid anhydrides or corresponding polycarboxylic acid esters of lower alcohols or mixtures thereof may be used for preparing polyesters. The polycarboxylic acids may be aliphatic, cycloaliphatic, aromatic and/or heterocyclic and may be substituted, e.g. with halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrachlorophthalic acid anhydride; tetrahydrophthalic acid anhydride; hexahydrophthalic acid anhydride; endomethylene tetrahydrophthalic acid anhydride; glutaric acid anhydride; maleic acid; maleic acid anhydride; fumaric acid, dimeric and trimeric fatty acids such as oleic acid which may be mixed with monomeric fatty acids; dimethyl terephthalate or terephthalic acid-bis-glycol esters. Suitable polyhydric alcohols are e.g. ethylene glycol, propylene-1,2-glycol, propylene-1,3-glycol, butylene-1,4-glycol, butylene-2,3-glycol, hexane-1,6-diol, octane-1,8-diol, neopentyl glycol, cyclohexane dimethanol (1,4-bis-hydroxymethylcyclohexane), 2-methyl-1,3proponediol, glycerol, trimethylolpropane, hexane-1,2,6-triol, butane-1,2,4-triol, trimethylolethane, pentaerythritol, quinitol, mannitol and sorbitol, methylglycoside, diethyleneglycol, triethylene glycol, tetraethyleneglycol, polyethylene glycols, dipropyleneglycol, polypropylene glycols, dibutylene glycol and polybutylene glycols. A proportion of polyesters may contain carboxyl end groups. Any suitable polyester of a lactone such as -caprolactone or any suitable hydroxycarboxylic acid such as -hydroxycaproic acid may be used. The low molecular weight polyhydric alcohols mentioned above may also be used as such.

The polyethers with hydroxyl groups which may be used according to the invention and which contain at least 2, generally 2 to 8 and preferably 2 or 3 hydroxyl groups are known per se and are prepared e.g. by the polymerization of expoxides such as ethylene oxide, propylene oxide, butylene oxide, tetrahydrofuran, styrene oxide or epichlorohydrin, either each with itself, e.g. in the presence of boron trifluoride or by the addition of these epoxides, either as mixtures or successively, to starting components which contain reactive hydrogen atoms, such as alcohols or amines, e.g. water, ethylene glycol, propylene-1,3-glycol, propylene-1,2-glycol, trimethylolpropane, 4,4'-dihydroxy-diphenylpropane, aniline, ammonia, ethanolamine, ethylene diamine or the like. Sucrose polyethers such as those described e.g. in German Auslegeschriften No. 1,176,358 and 1,064,938 may also be used according to the invention. It is frequently preferred to use polyethers which contain predominatly (up to 90% by weight, based on all the hydroxyl groups present in the polyether) primary hydroxyl groups. Polyethers modified with vinyl polymers, e.g. those obtained by the polymerization of styrene or acrylonitrile in the presence of polyethers (U.S. Pat. Nos. 3,383,351; 3,304,273; 3,523,093 and 3,110,695 and German Pat. No. 1,152,536 the disclosures of which are incorporated herein by reference) and polybutadienes which contain hydroxyl groups are also suitable.

Any suitable polythioether may be used such as, for example, the condensation products of thiodiglycol with itself and/or with other glycols, dicarboxylic acids, formaldehyde, aminocarboxylic acids, aminoalcohols or the like. The products obtained are either polythio mixed ethers, polythioether esters or polythioether-ester amides, depending upon the cocomponent.

Any suitable polyacetal may be used such as e.g. the compounds which can be prepared from glycols such as diethylene glycol, triethylene glycol, 4,4'-dioxethoxydiphenyl-dimethylmethane or hexanediol and formaldehyde. Polyacetals suitable for the purpose of the invention may also be prepared by polymerizing cyclic acetals.

Any suitable polycarbonate with hydroxyl groups may be used such as the kind known per se, e.g. those obtained by reacting diols such as propane-1,3-diol, butane-1,4-diol and/or hexane-1,6-diol, diethylene glycol, triethyleneglycol or tetraethylene glycol with diarylcarbonates such as diphenylcarbonate or phosgene.

Any suitable polyester amide or polyamide may be used such as the predominately linear condensates obtained from polybasic saturated and unsaturated carboxylic acids or their anhydrides and polyvalent saturated and unsaturated amino alcohols, diamines, polyamines and mixture thereof.

Polyhydroxyl compouunds which already contain urethane or urea groups and modified or unmodified natural polyols such as castor oil, carbohydrates or starch may also be used. Addition products of alkylene oxides with phenol formaldehyde resins or with urea formaldehyde resins may be used in the process according to the invention.

Representatives of these compounds used in the foamable reaction mixture according to the invention have been described e.g. in High Polymers, Volume XVI, "Polyurethanes, Chemistry and Technology", by Saunders-Frisch, Interscience Publishers, New York, London, Volume I, 1962, pages 32 – 42 and pages 44 – 54 and Volume II, 1964, pages 5 – 6 and 198 to 199 and in Kunststoff-Handbuch Volume VII, Vieweg-Hochtlen, Carl-Hanser-Verlag, Munich, 1966, e.g. on pages 45 to 71, the disclosures of which are incorporated herein by reference.

For producing the semi-rigid elastomeric foams with a dense outer skin which are of special interest in this invention, it is particularly preferred to use difunctional polyhydroxyl compounds of the type mentioned above, optionally mixed with up to 10 hydroxyl equivalent percent, based on the total mixture of polyhydroxyl compounds, of the higher functional and in particular trifunctional polyhydroxyl compounds.

In the process according to the invention, the reactants (including water which may be used as blowing agent) are used in proportions which correspond to an isocyanate ratio of 70 to 160 (an isocyanate ratio of 100 means that the reaction mixture contains equivalent quantities of isocyanate groups and active hydrogen atoms which enter into reaction with these isocyanate groups). For producing the semi-rigid elastomeric foams with dense outer skin which are of special interest in this invention, the isocyanate ratio is generally between 90 and 110.

According to the invention, water and/or any suitable readily volatile organic substance may be added to the reaction mixture as a blowing agent. Suitable organic blowing agents are e.g. acetone, ethyl acetate, halogenated alkanes such as methylene chloride, chloroform, ethylidene chloride, vinylidene chloride, monofluorotrichloromethane, chlorodifluoromethane, dichlorodifluoromethane, trichlorotrifluoroethane or butane, hexane, heptane, diethylether and the like. Compounds which decompose at temperatures above room temperatures to liberate gases, for example nitrogen, may also act as blowing agents, e.g. azo compounds such as azoisobutyric acid nitrile. Other examples of blowing agents and details about the use of blowing agents may be found in Kunststoff-Handbuch, Volume VII, published by Vieweg and Hochtlen, Carl-Hanser-Verlag, Munich 1966, e.g. on pages 108 and 109, 453 to 455 and 507 to 510, the disclosure of which is incorporated herein by reference.

Any suitable catalyst of the kind known per se, may be used, such as e.g. tertiary amines such as triethylamine or tributylamine; N-methyl-morpholine; N-ethyl-morpholine; N-cocomorpholine; N,N,N',N'-tetramethyl-ethylenediamine; 1-4-diaza-bicyclo-(2,2)-octane; N-methyl-N'-dimethylaminoethylpiperazine; N,N-dimethyl-benzylamine; bis-(N,N-diethylaminoaminoethyl)-adipate; N,N-diethylbenzylamine; pentamethyldiethylene-triamine; N,N-dimethylcyclohexylamine; N,N,N',N'-tetramethyl-1,3-butanediamine; N,N-dimethyl-$\beta$-phenyl-ethylamine; 1-2-dimethylimidazole; 2-methylimidazole tetramethylguanidine or the like.

The following are examples of suitable tertiary amine catalysts which contain hydrogen atoms capable of reacting with isocyanate groups: triethanolamine; tri-isopropanolamine; N-methyldiethanolamine; N-ethyldiethanolamine; N,N-dimethylethanolamine and their reaction products with alkylene oxides such as propylene oxide and/or ethylene oxide.

Silaamines which contain carbon-silicon bonds may also be used as a catalyst, e.g. those described in German Pat. No. 1,229,290, for example 2,2,4-trimethyl-2-silamorpholine or 1,3-diethylaminomethyl-tetramethyldisiloxane.

Nitrogen-containing bases such as tetraalkylammonium hydroxides, alkali metal hydroxides such as sodium hydroxide, alkali metal phenolates such as sodium phenolate or alkali metal alcoholates such as sodium methylate may also be used as catalyst. Hexahydrotriazines are also suitable catalysts.

The heretofore disclosed organic metal compound catalysts may also be used as catalysts according to the invention, in particular organic tin compounds.

The organic tin compounds used are preferably tin (II) salts of carboxylic acids such as tin (II) acetate; tin (II) octoate; tin (II) ethylhexoate and tin (II) chlorate and the dialkyltin salts of carboxylic acids, e.g. dibutyltin diacetate; dibutyltin dilaurate; dibutyltin maleate, dioctyltin diacetate or the like.

Other representatives of catalysts which may be used according to the invention and details of the actions of the catalysts are described in Kunststoff-Handbuch, Volume VII, published by Vieweg and Höchtlen, Carl-Hanser-Verlag, Munich 1966, e.g. on pages 96 to 102.

The catalysts may be used in any catalytic amount, preferably in quantities of from about 0.001% to 10% by weight, based on the weight of organic compounds which contain at least two hydrogen atoms capable of reacting with isocyanates and which have a molecular weight of about 62 to about 10,000.

Surface-active additives (emulsifiers and foam stabilizers) may also be used according to the invention. The emulsifiers used may be e.g. the sodium salts of ricinoleic sulphonates or of fatty acids or salts of fatty acids with amines such as oleic acid diethylamine or stearic acid diethanolamine. Alkali metal or ammonium salts of sulphonic acids such as dodecylbenzene sulphonic acid or dinaphthylmethanesulphonic acid or fatty acids such as ricinoleic acid or of polymeric fatty acids may also be used as surface active additives.

Suitable foam stabilizers are particularly the water-soluble polyether siloxanes. The structure of these compounds is generally such that a copolymer of ethylene oxide and propylene oxide is connected to a polydimethylsiloxane group. Foam stabilizers of this kind have been described e.g. in U.S. Pat. No. 3,629,308.

According to the invention, there may also be added reaction retarders, e.g. substances which are acid in reaction such as hydrochloric acid, sulphuric acid, phosphoric acid or organic acid halides, cell regulators known per se such as paraffins or fatty alcohols or dimethyl polysiloxanes; pigments or dyes and flame retarding agents known per se, e.g. tris-chloroethyl-phosphate or ammonium phosphate and ammonium polyphosphate; stabilizers against ageing and weathering, plasticizers, fungistatic and bacteriostatic substances and fillers such as barium sulphate, kieselguhr, carbon black or whiting.

Other examples of surface active additives; foam stabilizers; cell regulators; reaction retarders; stabilizers; flame retarding additives; plasticizers; dyes; fillers; fungistatic and bacteriostatic substances which may also be added according to the invention if desired and details of methods of using them and of their mode of action may be found in Kunststoff-Handbuch, Volume VI, published by Vieweg and Höchtlen, Carl-Hanser Verlag, Munich 1966, e.g. on pages 103 to 113.

The foaming process according to the invention improves the release properties in any suitable metal mold. The foamable reaction mixture is introduced into a mold which may be made of a metal, e.g. aluminum, or any other suitable metal. The foamable reaction mixture foams up inside the mold to form the molded product. Foaming in the mold may be carried out so that the molded product has a cellular structure on its surface as well as in its core or it may be carried out to produce a molded product with a dense substantially non-porous skin and a cellular core. According to the invention, the quantity of foamable reaction mixture introduced into the mold may be just sufficient to fill the mold with foam or, alternatively, a larger quantity of foamable reaction mixture than is required for filling the interior of the mold with foam may be used, that is to say foaming may be carried out under so-called overcharging conditions. A method of this kind has been described e.g. in U.S. Pat. Nos. 3,178,490 and 3,182,104, the disclosures of which are incorporated herein by reference.

Cold setting foams may also be produced according to the invention (see British Pat. No. 1,162,517 and German Offenlegungsschrift No. 2,153,086).

Conventional mold release agents may be used in addition to the mold release provided by the invention.

According to the invention, reaction products of the polysiloxanes which contain reactive hydrogen atoms and organic monoisocyanates and/or polyisocyanates are used as internal mold release agents.

Any suitable polysiloxane which contains reactive hydrogen atoms may be used. Such polysiloxanes are known per se (see German Auslegeschrift No. 1,122,698). According to the invention, those polysiloxanes which are particularly suitable contain 1 to 6 active hydrogen atoms in the molecule, for example those which contain 1 to 6 $CH_2-NH-(C_1-C_8)$-alkyl- or -cycloalkyl groups (e.g. methyl, ethyl, n-butyl, i-butyl, amyl, n-hexyl, cyclohexyl, n-heptyl, n- or isooctyl groups and/or 1 to 6—$CH_2OH$ groups).

According to the invention, it is preferred to use those polysiloxanes which are represented by the following general formula:

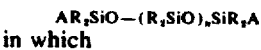

in which n represents 3 to 300, preferably 3 to 100P1 R represent a methyl and/or phenyl group and may be the same as or different from A, and A represents a monovalent group which contains Zerewitinoff active hydrogen atoms, in particular $CH_2OH$ or $-CH_2NH-(C_1-C_8)$-alkyl or $-CH_2NH-(C_3-C_8)$-cycloalkyl.

The polysiloxane molecule preferably contains 1 to 6 of the groups represented by A. It is preferred to use straight chain liquid polysiloxanes in particular those in which R represents methyl and/or A.

Polysiloxanes which have been found to be particularly useful are straight chain methylpolysiloxanes, e.g. those having the general formula indicated above, which contain at least one $CH_2OH$ group in the molecule and 1 to 8% by weight of hydroxyl, e.g.

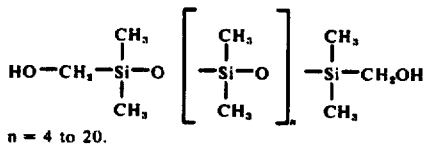

n = 4 to 20.

Other particularly advantageous polysiloxanes are those preferably straight chain polysiloxanes in which n = 20 to 80, R represents methyl and A represents at least one (preferably 2 to 6) $CH_2-NH-(C_1-C_8)$-alkyl or $CH_2-NH-(C_1-C_8)$-cycloalkyl groups, e.g.

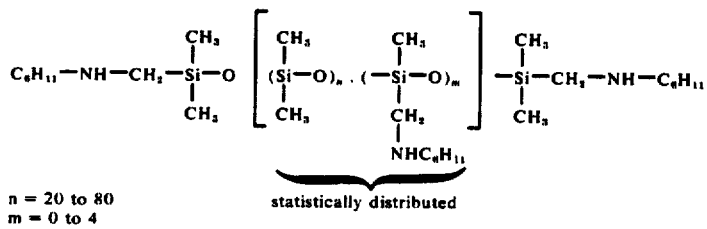

n = 20 to 80
m = 0 to 4 statistically distributed

The preparation of polysiloxanes which contain reactive hydrogen atoms suitable for use in the invention is already known (see U.S. Pat. Nos. 3,481,963; 3,442,925 and 2,738,357 the disclosures of which are incorporated herein by reference).

Any known organic monoisocyanate or polyisocyanate is suitable in principle use in preparing the mold release reaction product with the above mentioned polysiloxanes, in particular the organic polyisocyanates which have been mentioned above for the production of the foams.

Any suitable organic monoisocyanate may be used including aliphatic, araliphatic, aromatic or heterocyclic isocynates or acylisocyantes. Isocyanates which contain more than five carbon atoms in the molecule are preferred although other isocyanates, e.g. methylisocyanate, chlorocarbonylisocyanate or methoxymethylisocyanate may also be used for modification if desired.

The following are examples of suitable monoisocyanates for reaction with a polysiloxane to produce the mold release of the invention; benzylisocyanate; benzoylisocyanate; tosylisocyanate; phenylisocyanate, tolylisocyanate, dimethylphenylisocyanate, phenoxyphenylisocyanate; tetradecylisocyanate; hexadecylisocyanate; cyclohexylisocyanate; isopentylisocyanate; isononylisocyanate and monoisocyanates of the kind derived from amines which can be obtained synthetically from resinic acid or fatty acids, for example dihydroabietyl isocyanate, oleyl isocyanate or stearylisocyanate. Also suitable are those monoisocyanates which can be obtained e.g. by reacting compounds which contain Zerewitinoff active hydrogen atoms if these compounds, which preferably contain one such hydrogen atom in the molecule, are reacted with polyisocyanates, in particular, with diisocyanates, so that the reaction product obtained is an addition compound which still contains one isocyanate group in the molecule, in other words the reaction is preferably carried out in such a way that the molar ratio of the compounds which undergo reaction is 1:1.

Monoisocyanates with a complex structure such as those which can be obtained from polyesters or polyethers which basically contain only one hydroxyl, amino or carboxyl group per molecule by reacting them with diisocyanates, e.g. the diisocyanates which can be obtained by the phosgenation of aniline-formaldehyde condensates, are also of interest. As examples there may be mentioned in this connection the equimolar reaction products of polyaddition products of ethylene oxide and/or propylene oxide with monoalcohols and diphenylmethane diisocyanate, tolylene diisocyanate, 1-isocyanato-3,5,5-trimethyl-5-isocyanatomethylcyclohexane, hexamethylene diisocyanate, undecamethylene diisocyanate, naphthylene-1,5-diisocyanate or equilmolar reaction products of these isocyanates with benzylamine, cyclohexylamine, oleylamine or monoamino-polyethers.

In principle, monoisocyanates of this kind can also be obtained from molecules which contain n isocyanate groups by reacting n—1 of these isocyanate groups with suitable acceptors, e.g. with hydroxyl or amino groups.

Reaction products of polysiloxanes which contain Zerewitinoff active hydrogen atoms and organic polyisocyanates are particularly suitable for the purpose of the invention. In principle, the polyisocyanates already described above for the preparation of the foam products may be used for preparing these reaction products, for example, tetramethylene diisocyanate, hexamethylene diisocyanate, N-xylylene diisocyanate, p-xylylene diisocyanate, 4,4'-dimethyl-1,3-xylylene diisocyanate, cyclohexane-1,4-diisocyanate, isophorone diisocyanate, dicyclohexylmethane-4,4'-diisocyanate, m-phenylene-diisocyanate, p-phenylene diisocyanate, 1-alkylbenzene-2,4-diisocyanate and 1-alkylbenzene-2,6-diisocyanates, tolylene-2,4-diisocyanate, tolylene-2,6-diisocyanate, 3-(α-isocyanatoethyl)-phenylisocyanate, 1-benzylbenzene-2,6-diisocyanate, 2,6-diethyl-benzene-1, 4-diisocyanate, diphenylmethane-4,4'-diisocyanate 3,3'-dimethoxy-diphenylmethane-4,4'-diisocyanate and naphthylene-1,5-diisocyanate.

Trifunctional and higher functional polyisocyanates may also be reacted with polysiloxane, e.g. toluene -2, 4,6-triisocyanate or polymethylene-polyphenyl-polyisocyanate obtained by aniline-formaldehyde condensation followed by phosgenation, or the polyisocyanates which can be prepared according to German Pat. No. 1,092,007 or modified 4,4'-diphenylmethane diisocyanate which has been liquefied by reaction with low molecular weight glycols such as tripropylene glycol.

Isocyanates which contain carbodiimide, uretdione, uretoneimine, allophanate, biuret and isocyanurate groups may also be used. Mixtures of the above mentioned isocyanates may also be used. In addition, reaction products of polyhydric alcohols with polyvalent isocyanates may also be used, or also polyisocyanates of the kind used e.g. according to German Pat. Nos. 1,022,789 and 1,027,394.

Aromatic polyisocyanates such as tolylene diisocyanates are particularly suitable and the aromatic multinuclear isocyanates which can be obtained by phosgenating aniline-formaldehyde condensates are especially suitable for reaction with the polysiloxane.

The polysiloxanes may also be reacted with several types of isocyanates either successively or as mixtures.

The reaction of the polysiloxanes or mixtures of polysiloxanes with the polyisocyanates is carried out by mixing the polysiloxane with the isocyanate and then reacting the mixture at temperature of between 30° and 250° C preferably between 45° and 150° C, optionally with stirring. Lower reaction temperatures could, in principle, also be employed but the time required to obtain reaction products suitable for the process according to the invention is then too long to be economical. Although catalysts could be used to accelerate the reaction, they should be avoided in order to avoid, as far as possible, any undesirable change in the reactivity of the isocyanate component in the subsequent production of the foam.

In the reaction of the polysiloxane with the polyisocyanate, the molar ratio of active hydrogen atoms to isocyanate groups is generally kept within the range of 1:1 to 1:25. The reaction products are frequently prepared by reacting a mixture of 0,1 to 50% by weight, preferably of 0.5 to 50% by weight (more preferably 1 to 35% by weight) of polysiloxane with 99.5 to 50% by weight (preferably 99 to 65% by weight), of polyisocyanate at temperatures of between 30° and 250° C.

The reaction product to be used according to the invention may be added as such to the starting components used for producing the foam, e.g. to the polyisocyanate or to the polyol, but it is often advantages to prepare the reaction products in situ in the polyisocyanate which is used as starting material for producing the foams. In that case, the quantity of polysiloxane used, based on the polyisocyanate is generally between 0.5 and 25% by weight, preferably between 2% and 18% by weight. When the reaction product has been prepared in situ in excess polyisocyanate, the product obtained is directly suitable for foaming ("modified" polyisocyanate), foam products with excellent mold release properties being thereby obtained.

It is of course also possible, as has been described above, first to prepare the reaction products of polyisocyanates and polysiloxanes and later to dilute these reaction products with an additional quantity of polyisocyanate, optionally a different polyisocyanate, or if desired, the reaction product used according to the invention may be added separately during the production of the foam.

The foam formulations may, of course, in addition contain other mold release agents or mold release systems, for example those described in German Offenlegungsschrift No. 1,953,637 or in Belgian Pat. 782,942, e.g. the oleic acid or tall oil fatty acid salt of the amide-containing amine obtained by reacting N-dimethylaminopropylamine with oleic acid or tall oil fatty acid.

According to the invention, the reactants may be reacted together by the one-step, prepolymer or semi-prepolymer process known per se, often using mechanical apparatus, e.g. those described in U.S. Pat. No. 2,764,565 for mixing prior to charging of the foamable reaction mixture in the mold. Details concerning processing apparatus which may be used according to the invention may be found in Kunststoff-Handbuch, Volume VI, published by Vieweg and Hochtlen, Carl-Hanser-Verlag, Munich 1966, e.g. on pages 121 to 205.

The products of the process may be obtained as rigid foam materials used for producing furniture parts, body parts of vehicles, technical apparatus and structural elements or as semi-rigid to flexible materials for producing safety padding in the construction of motor vehicles, elastic shoe soles, shock absorbers, and other cushioning means.

The process according to the invention will now be described by way of example. The parts given are parts by weight unless otherwise indicated. The percentages are percentages by weight.

EXAMPLES

A. The polysiloxane used in a straight chain polymethyl siloxane which contains one $CH_2OH$ group at each end and has a hydroxyl content of about 3% by weight:

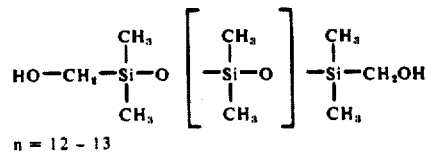

$n = 12 - 13$

B. The polysiloxane used is a straight chain polymethyl siloxane which contains a $CH_2OH$ group at each end and has a hydroxyl content of about 6% by weight:

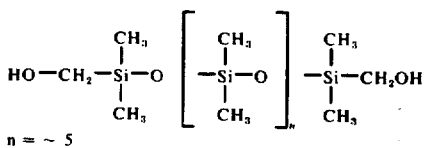

n = ~ 5

C. The polysiloxane used in a straight chain polymethylsiloxane which contains one $CH_2-NH-C_6H_{11}$ group at each end and three such groups statistically distributed in the chain of the molecule and which has a secondary nitrogen content of approximately 1.8% by weight:

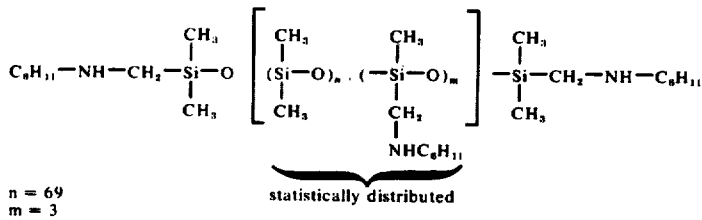

n = 69
m = 3
statistically distributed

D. The polysiloxane used is a basic polysiloxane similar to C but it contains only two secondary amino groups statistically distributed in the chain of the molecule and it has a secondary nitrogen content of approximately 1% by weight.

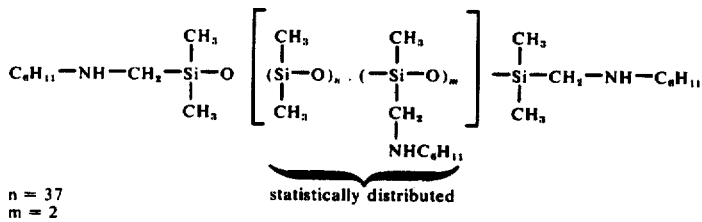

n = 37
m = 2
statistically distributed

E. Reaction product of polysiloxane C and stearylisocyanate: 200 Parts of polysiloxane C are vigorously mixed with 82 parts of stearylisocyanate at room temperature. The mixture heats up slightly and is then stirred for a further 60 minutes at 35° C. It is then homogeneous and ready for use.

F. Reaction product of polysiloxane D: 200 parts of polysiloxane D and 10 parts of phenylisocyanate are stirred together at 30° C. The reaction mixture is then heated to 80° C for 1 hour. 30 Parts of the product prepared in this way and 70 parts of a polyisocyanate which has been prepared by phosgenating aniline-formaldehyde condensates and which has a viscosity of 92 cP at 25° C and an isocyanate content of 31.5% by weight are then stirred together for 1 hour at 130° C. A homogeneous solution which has an isocyanate content of about 28% by weight is obtained.

EXAMPLE 1 a. Preparation of the reaction products to be used according to the invention in the polyisocyanate 70 Parts by weight of a polyisocyanate which has been prepared by phosgenating aniline-formaldehyde condensates and which has a viscosity of 92.0 cP at 25° C and an isocyanate content of 31.5% by weight, and 30 parts by weight of the difunctional polysiloxane B with hydroxyl end groups are used.

The polyisocyanate is introduced into a stirrer apparatus and heated to 100° C. The polysiloxane is added to the apparatus from a dropping funnel over a period of 1 hour while stirring the polyisocyanate. After all of the polysiloxane has been added, stirring is continued for 1 hour at 100° C. The finished reaction product has an isocyanate content of 17.6% and is homogeneous.

b. Process according to the invention

100 Parts by weight of a polyol mixture with hydroxyl number 205 and a viscosity of 950 cP at 25° C, consisting of 1. 70 Parts by weight of a poly(alkylene ether)glycol of hydroxyl number 28 which has been prepared by the addition of a mixture of 80% propylene oxide and 20% of ethylene oxide to propylene glycol and
2. 20 Parts by weight of a poly(alkylene ether) polyol with hydroxyl number 32 which has been prepared by the addition of a mixture of 87% of propylene oxide and 13% of ethylene oxide to trimethylol propane,
3. 14 parts by weight of butane-1,4-diol,
4. 
   1 part by weight of ethylene glycol
   0.6 parts by weight of triethylenediamine
   0.06 parts by weight of dibutyltin (IV) laurate
   0.1 parts by weight of water
   7 parts by weight of monofluorotrichloromethane
   3 parts by weight of methylene chloride
   48 parts by weight of a polyisocyanate based on diphenyl methane-4,4'-diisocyanate which has an isocyanate content of 30.3% and which has been liquified by a uretone-imine content of 15% and which has been obtained by mixing at about 80° C about 1000 parts (4 mols) of 4,4'-diphenylmethane diisocyanate with about 2.5 mol % of urea and heating the resulting mixture at about 225° C until said NCO-content has been reached, and 16 parts by weight of the polyisocyanate according to 1 (a) are used as starting components.

The polyol mixture and blowing agent are mixed with the isocyanate mixture by means of a two-component feeding and mixing apparatus and introduced into a closed aluminum mold. The temperature of this mold is 60° C. The foamable synthetic resin mixture begins to foam up after 6 seconds and sets after a further 5 seconds. The molded product fills the mold and can be removed from the mold after 3 minutes without sticking to the surface. It has an overall gross density of 0.80 g/cm³ and it has a thickness of 10 mm with a solid marginal zone on each side.

EXAMPLE 2 a. Preparation of the reaction products to be used according to the invention in the polyisocyanate The following components are used:
70 Parts by weight of a polyisocyanate based on diphenylmethane-4,4'-diisocyanate which has been described in Example 1 (b) and 30 parts by weight of the difunctional polysiloxane A with hydroxyl end groups.

The polyisocyanate is introduced into an apparatus equipped with a stirrer and heated to 120° C. The polysiloxane is introduced to the apparatus from a dropping funnel over a period of 30 minutes. The reaction mixture is stirred for 1 hour at 120° C and then heated to 140° C and reacted at this temperature for 40 hours with vigorous stirring. The finished reaction product has an isocyanate content of 19.2% and is homogeneous.

b. Process according to the invention

The following starting components are used:
100 Parts by weight of a polyol mixture with hydroxyl number 205 a viscosity of 950 cP at 25° C consisting of 1. 70 Parts by weight of a poly(alkylene ether)glycol with hydroxyl number 28 which has been obtained by the addition of a mixture of 80% of propylene oxide and 20% of ethylene oxide to propylene glycol and
2. 20 parts by weight of a poly(alkylene ether)polyol with hydroxyl number 32 which has been obtained by the addition of a mixture of 87% of propylene oxide and 13% of ethylene oxide to trimethylol propane,
3. 14 parts by weight of butane-1,4-diol,
4.
   1 part by weight of ethylene glycol
   0.6 part by weight of triethylene diamine
   0.06 part by weight of dibutyl tin(IV) laurate
   0.1 part by weight of water
   7 parts by weight of monofluorotrichloromethane,
   3 parts by weight of methylene chloride
   47 parts by weight of a polyisocyanate based on diphenylmethane-4,4'-diisocyanate which has been described in Example 1 (b) and
   16 parts by weight of the polyisocyanate according to 2(a).

The polyol mixture and blowing agent are mixed with the isocyanate mixture using a two component feeding and mixing apparatus and introduced into a closed aluminum mold. The temperature of this mold is 60° C.

The synthetic resin mixture begins to foam up after 6 seconds and sets after a further 5 seconds. The molded product fills the mold and can be removed from the mold after 3 minutes without adhering to it. It has an overall gross density of 0.80 g/cm³ and a thickness of 10 mm with a solid marginal zone on both sides.

EXAMPLE 3 a. Preparation of the reaction product to be used according to the invention in the polyisocyanate The following components are used:

23.3 Parts by weight of a polyisocyanate which has been prepared by phosgenating aniline-formaldehyde condensates and which has a viscosity of 92 cP at 25° C and an isocyanate content of 31.5% by weight;
23.3 parts by weight of a polyisocyanate based on diphenyl methane-4,4'-diisocyanate, which has been described in Example 1(b);
23.3 Parts by weight of diphenylmethane-4,4'-diisocyanate; and, 30 parts by weight of the difunctional polysiloxane B with hydroxyl end groups.

The isocyanate mixture is introduced into an apparatus provided with a stirrer and heated to 100° C. The polysiloxane is added to the apparatus from a dropping funnel over a period of 1 hour while the polyisocyanate is stirred. After all of the polysiloxane has been added, stirring is continued for 1 hour at 100° C. The finished reaction product has an isocyanate content of 17.2% and is homogeneous.

b. Process according to the invention

The following starting components are used:
100 parts by weight of a polyol mixture with hydroxyl number 205 and a viscosity of 950 cP at 25° C consisting of 1. 70 Parts by weight of a poly(alkylene ether)glycol with hydroxyl number 28 which has been obtained by the addition of a mixture of 80% of propylene oxide and 20% of ethylene oxide to propylene glycol and
2. 20 Parts by weight of a poly(alkylene ether)polyol with hydroxyl number 32 which has been obtained by the addition of a mixture of 87% propylene oxide and 13% of ethylene oxide to trimethylolpropane,
3. 14 parts by weight of butane-1,4-diol,
4.
   1 part by weight of ethylene glycol
   0.6 part by weight of triethylenediamine
   0.06 part by weight of dibutyltin(IV) laurate 0.1 part by weight of water
   7 parts by weight of monofluorotrichloromethane
   3 parts by weight of methylene chloride
   48 parts by weight of a polyisocyanate based on diphenylmethane-4,4'-diisocyanate which has been described in Example 1(b), and
   16 parts by weight of the polyisocyanate according to 3(a).

The polyol mixture and blowing agent are mixed with the isocyanate mixture, using a two-component feeding and mixing apparatus, and the resulting mixture is introduced into a closed, aluminum mold. The temperature of this mold is 60° C. The synthetic resin mixture starts to foam after 6 seconds and sets after a further 5 seconds. The molded product can be removed from the mold after 3 minutes without adhering to it. It has an overall gross density of 0.80 g/cm³ and a thickness of 10 mm with a solid marginal zone on both sides.

EXAMPLE 4 a. Preparation of the reaction product to be used according to the invention in the polyisocyanate The following components are used:

70 parts by weight of a polyisocyanate which has been prepared by phosgenating aniline-formaldehyde condensates and which has a viscosity of 92.0 cP at 25° C and an isocyanate content of 31.5% by weight, and
30 parts by weight of difunctional polysiloxane B with hydroxyl end groups. Preparation is carried out as in Example 1(a).

b. Process according to the invention

The following starting components are used:

100 Parts by weight of a polyol mixture with hydroxyl number 205 and a viscosity of 950 cP at 25° C, consisting of 70 parts by weight of a poly(alkylene ether)glycol with hydroxyl number 28 which has been obtained by the addition of a mixture of 80% of propylene oxide and 20% of ethylene oxide to propylene glycol; 20 parts by weight of a poly (alkylene ether)polyol with hydroxyl number 32 which has been obtained by the addition of a mixture of 87% of propylene oxide and 13% of ethylene oxide to trimethylolpropane;
14 Parts by weight of butane-1,4-diol,
1 Part by weight of ethylene glycol
1.5 Parts by weight of fatty acid ester (prepared from 2.5 mol of pentaerythritol, 1 mol of adipic acid and 6 mol of oleic acid)
1.5 Parts by weight of amidamine oleic acid salt (prepared from 1 mol of 3-dimethylaminopropylamine-1 and 2 mol of oleic acid)
0.6 Parts by weight of triethylene diamine
0.06 Parts by weight of triethylene diamine
0.06 Parts by weight of dibutyl tin(IV) laurate,
0.1 Parts by weight of water
7 Parts by weight of monofluorotrichloromethane
3 Parts by weight of methylene chloride
48 Parts by weight of a polyisocyanate based on diphenyl methane-4,4'-diisocyanate, which has been described in Example 1(b) and
16 Parts by weight of the polyisocyanate according to 1(a).

The polyol mixture and blowing agent are mixed with the isocyanate mixture, using a two component feeding and mixing apparatus, and the resulting mixture is introduced into a closed aluminum mold. The temperature of this mold is 60° C. The synthetic resin mixture begins to foam after 6 seconds and sets after a further 5 seconds. The molded product can be removed from the mold after 3 minutes without adhering to it. It has an overall gross density of 0.80 g/cm³ and a thickness of 10 mm with a solid marginal zone on both sides.

EXAMPLE 5 a. Preparation of the reaction product to be used according to the invention in the polysiocyanate The following components are used:
70 Parts by weight of a polyisocyanate which has been prepared by the phosgenation of aniline-formaldehyde condensates and which has a viscosity of 92.0 cP at 25° C and NCO content of 31.5% by weight, and 30 parts by weight of difunctional polysiloxane B with hydroxyl end groups.

The polyisocyanate is introduced into an apparatus provided with a stirrer and heated to 100° C. The polysiloxane described in Example B is added from a dropping funnel over a period of one hour. After all the polysiloxane has been added, stirring is continued for one hour at 100° C. The finished reaction product has an isocyanate content of 17.6%.

b. Process according to the invention

100 Parts by weight of a polyol mixture with hydroxyl number 550 and a viscosity of 1650 cP at 25° C, consisting of 60 parts by weight of a poly(alkylene ether)polyol with hydroxyl number 830 which has been obtained by the addition of propylene oxide to trimethylolpropane and,
40 parts by weight of a poly(alkylene ether)polyol with hydroxyl number 42 which has been obtained by the addition of a mixture of propylene oxide and ethylene oxide to a mixture of trimethylolpropane and propylene glycol (molar ratio 3:1),
1 part by weight of a polysiloxane-polyalkylene oxide block copolymer as foam stabilizer,
0.6 parts by weight of tetramethylguanidine as catalyst
3 parts by weight of dimethyl-benzylamine as catalyst
12 parts by weight of monofluorotrichloromethane
3 parts by weight of amidamine oleic acid salt (prepared from 1 mol of 3-dimethylaminopropylamine-1 and 2 mol of oleic acid)
110 parts by weight of a polyisocyanate which has been prepared by phosgenating aniline-formaldehyde condensates and which has a viscosity of 320 cP at 25° C and isocyanate content of 31%, and
37 parts by weight of the polyisocyanate according to 1(a).

The polyol mixture and blowing agent are mixed with the isocyanate mixture, using a two component feeding and mixing apparatus, and the resulting mixture is introduced into a closed, aluminum mold. The temperature of this mold is 60° C.

The synthetic resin mixture begins to foam after 18 seconds and sets after a further 20 seconds.

The molded product can be removed from the mold after 5 minutes. It lies loosely in the mold without any adherence to it. It has an overall gross density of 0.60 g/cm³ and a thickness of 10 mm with a solid marginal zone on both sides.

EXAMPLE 6 a. Preparation of the reaction product to be used according to the invention in the polyisocyanate The following components are used:

70 Parts by weight of a polyisocyanate based on diphenyl methane-4,4'-diisocyanate which has been described in Example 1(b) and
30 parts by weight of a linear poly-methyl-phenyl-siloxane in which the proportion of dimethylsiloxane units to diphenyl siloxane units incorporated in the molecule is approximately 3:1 and which contains one CH₂OH end group and has a hydroxyl content of about 3% by weight.

The polyisocyanate is introduced into an apparatus provided with a stirrer and heated to 120° C. The polymethylphenylsiloxane is added to the apparatus from a funnel over a period of 30 minutes. Stirring is continued for 1 hour at 120° C and the reaction mixture is then heated to 140° C and reacted at this temperature for 40 hours with vigorous stirring. The finished reaction product has an isocyanate content of 18.9%.

b. Process according to the invention

The following starting materials are used:
100 Parts by weight of a polyol mixture with hydroxyl number 205 and a viscosity of 950 cP at 25° C, consisting of 1. 70 Parts by weight of poly(alkylene ether)glycol with hydroxyl number 28 which has been obtained by the addition of a mixture of 80% of propylene oxide and 20% of ethylene oxide to propylene glycol and
2. 20 parts by weight of a poly(alkylene ether)polyol with hydroxyl number 32 which has been obtained by the addition of a mixture of 87% of propylene oxide and 13% of ethylene oxide to trimethylolpropane,
3. 14 parts by weight of butane-1,4-diol
4. 
   1 part by weight of ethylene glycol
   0.6 part by weight of triethylenediamine
   0.06 part by weight of dibutyl tin(IV) laurate
   0.1 part by weight of water
   7 parts by weight of monofluorotrichloromethane
   3 parts by weight of methylene chloride
   48 parts by weight of a polyisocyanate based on diphenyl methane-4,4'-diisocyanate, which has been described in Example 1(b) and
   16 parts by weight of the polyisocyanate according to 6(a).

The polyol mixture and blowing agent are mixed with the isocyanate mixture, using a two component feeding and mixing apparatus, and the resulting mixture is introduced into a closed aluminum mold. The temperature of this mold is 60° C.

The synthetic resin mixture begins to foam after 6 seconds and sets after a further 5 seconds. The molded product can be removed from the mold after 3 minutes without adhering to it. It has an overall gross density of 0.80 g/cm$^3$ and a thickness of 10 mm with a solid marginal zone on both sides.

EXAMPLE 7 a. Preparation of the reaction product to be used according to the invention in the polyisocyanate 70 Parts by weight of a semiprepolymer which has been obtained by reacting 5 mols of diphenylmethane-4,4'-diisocyanate with 1 mol of tripropylene glycol and which has an isocyanate content of 24%, and
30 parts by weight of difunctional polysiloxane B which has hydroxyl end groups are used.

The semiprepolymer is introduced into an apparatus having a stirrer and heated to 100° C. The polysiloxane is added to the apparatus from a dropping funnel over a period of 1 hour. When all the polysiloxane has been added, the mixture is reacted with stirring at 100° C for 6 hours. The isocyanate content of the finished reaction product is 14%.

b. Process according to the invention

The following starting components are used:
100 parts by weight of a polyol mixture with hydroxyl number 205 and a viscosity of 950 cP at 25° C consisting of 1. 70 parts by weight of a poly(aklkylene ether)glycol with hydroxyl number 28 which has been obtained by the addition of a mixture of 80% of propylene oxide and 20% of ethylene oxide to propylene glycol and
2. 20 parts by weight of a poly(alkylene ether)polyol with hydroxyl number 32 which has been obtained by the addition of a mixture of 87% of propylene oxide and 13% of ethylene oxide to trimethylol propane,
3. 14 parts by weight of butane-1,4-diol,
4. 
   1 part by weight of ethylene glycol,
   0.6 part by weight of triethylenediamine
   0.06 part by weight of dibutyl tin(IV) laurate
   0.1 part by weight of water
   7 parts by weight of monofluorotrichloromethane
   3 parts by weight of methylene chloride,
   52 parts by weight of a polyisocyanate based on diphenl methane-4,4'-diisocyanate, which has been described in Example 1(b), and
   17 parts by weight of the polyisocyanate according to 7(a).

The polyol mixture and blowing agent are mixed with the isocyanate mixture, using a two-component feeding and mixing apparatus, and the resulting mixture is introduced into a closed aluminum mold which is at a temperature of 60° C.

The synthetic resin mixture begins to foam after 6 seconds and sets after a further 5 seconds. The molded product can be removed from the mold after 3 minutes without adhering to it. It has an overall gross density of 0.80 g/cm$^3$ and a thickness of 10 mm with a solid marginal zone on both sides.

Any of the other mold release agents provided by the invention may be substituted for those used in the foregoing examples. As is apparent from the disclosure, this invention contemplates broadly the foaming of all foamable compositions which produce polyurethane foams and is not concerned with the provision of any new organic polyisocyanates, polyols or other conventional components of such a foamable reaction mixture. The invention, on the other hand, provides a new mold release compound for those heretofore known moldable foamable mixtures.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:
1. In a process for making molded polyurethane foams wherein a foamable reaction mixture is foamed in a closed mold, the improvement which comprises including in the foamable reaction mixture as an internal mold release agent a reaction product of an organic monoisocyanate or polyisocyanate and a polysiloxane which contains 1 to 6 —CH$_2$—NH—(C$_1$ to C$_8$ alkyl) or —CH$_2$—NH—(C$_3$ to C$_8$ cycloalkyl) groups in the molecule.

2. In a process for making molded polyurethane foams wherein a foamable reaction mixture is foamed in a closed mold, the improvement which comprises including in the foamable reaction mixture as an internal mold release agent a reaction product of an organic monoisocyanate or polyisocyanate and a polysiloxane represented by the general formula:

in which
$n$ represents 3 to 300
R represents i a methyl or phenyl groups, and
A represents $-CH_2-OH$ or $-CH_2-NH-(C_1$ to $C_8$ alkyl) or $-CH_2-NH-(C_3$ to $C_8$ cycloalkyl).

3. The process of claim 2 wherein the polysiloxane is a straight chain methyl polysiloxane which has at least one $CH_2OH$ end group and a hydroxyl content of about 1 to about 8% by weight.

4. The process of claim 2, wherein $n$ represents 3 to 100.

5. The process of claim 2 wherein the said mold release is obtained by reacting a mixture of about 1% to about 35% by weight of polysiloxane with about 99% to 65% by weight of polyisocyanate at a temperature between about 30° and about 250° C.

6. The process of claim 2 wherein said mold release agent is obtained by reacting about 1% to about 35% by weight of a straight chain methylpolysiloxane which contains $CH_2OH$ end groups and has a hydroxyl content of about 1% to about 8% by weight at a temperature of about 45° to about 150° C with about 99% to about 65% by weight of organic polyisocyanate prepared by phosgenating an aniline-formaldehyde condensate.

7. The process of claim 2 wherein the polyisocyanate used in making the mold release agent is the phosgenation product of an aniline-formaldehyde condensate.

8. The process of claim 2 wherein other mold release agents are used along with the said mold release agent.

9. The process of claim 2 wherein an organic compound which contains reactive hydrogen atoms and has a molecular weight of about 62 to about 10,000 is included in the foamable reaction mixture.

10. The product of the process of claim 2.

11. The process of claim 2 wherein R represents methyl.

* * * * *